United States Patent [19]

Pettinato

[11] Patent Number: 5,492,562
[45] Date of Patent: Feb. 20, 1996

[54] LOW FREEZING POINT ROOFING SHINGLE CONTAINING A CHLORIDE SALT

[76] Inventor: Dana M. Pettinato, 20 Peach St., Jamestown, N.Y. 14701-3712

[21] Appl. No.: 385,305

[22] Filed: Feb. 7, 1995

[51] Int. Cl.$^6$ .............................. C09D 195/00; E04D 1/00
[52] U.S. Cl. ................ 106/284.03; 106/279; 106/280; 106/284.2; 52/518
[58] Field of Search ................ 106/13, 284.03, 106/279, 280, 284.2; 52/518

[56] References Cited

U.S. PATENT DOCUMENTS

| | | |
|---|---|---|
| 217,713 | 5/1879 | Steward . |
| 322,280 | 7/1885 | Greenwood . |
| 3,830,687 | 8/1974 | Re et al. . |
| 4,012,537 | 3/1977 | Dubois .................................... 427/138 |
| 4,036,655 | 7/1977 | Yamada et al. . |
| 4,047,962 | 9/1977 | Copeland . |
| 4,094,686 | 6/1978 | Dubois .................................... 106/13 |
| 4,400,217 | 7/1983 | Kober . |
| 4,482,379 | 11/1984 | Dibrell et al. . |
| 4,520,606 | 6/1985 | Francovitch . |
| 4,707,961 | 11/1987 | Nunley et al. . |
| 4,783,942 | 11/1988 | Nunley et al. . |
| 5,165,990 | 11/1992 | Nakano . |
| 5,194,091 | 3/1993 | Laney . |
| 5,287,669 | 2/1994 | Hannah et al. . |

FOREIGN PATENT DOCUMENTS

| | | |
|---|---|---|
| 53-88030 | 8/1978 | Japan . |
| 53-147717 | 12/1978 | Japan . |
| 423772 | 4/1974 | U.S.S.R. ................................ 106/284 |
| 8463 | 7/1902 | United Kingdom . |
| 11522 | of 1909 | United Kingdom . |

*Primary Examiner*—David Brunsman
*Attorney, Agent, or Firm*—Richard C. Litman

[57] ABSTRACT

The present invention relates to asphalt shingles containing one or more chloride salts. The shingles disclosed herein remain flexible and pliant at sub-freezing temperatures, thereby preventing snow and ice from creeping underneath the shingles. The shingles are comprised of from 13 to 31% by weight of a chloride salt selected from the group consisting of calcium chloride, magnesium chloride hexahydrate, potassium chloride, sodium chloride, and mixtures thereof; and from 87 to 69% by weight asphalt.

10 Claims, No Drawings

5,492,562

LOW FREEZING POINT ROOFING SHINGLE CONTAINING A CHLORIDE SALT

BACKGROUND OF THE INVENTION

1. Field of the Invention

The present invention relates to asphalt roofing shingles. More specifically, the present invention relates to self-annealing asphalt shingles containing one or more chloride salts. The shingles disclosed herein remain flexible and pliant at sub-freezing temperatures, thereby preventing snow and ice from creeping underneath the shingles.

2. Description of the Prior Art

In upper latitudes and elevations, where the ambient temperature falls below freezing, and especially where there is a significant amount of snow fall, a chronic problem encountered by homeowners is water which gains unwanted entry into a dwelling. Typically, this nuisance occurs when the ambient temperature quickly cycles between warmer temperatures, and sub-freezing temperatures, or when there is a significant amount of snow fall followed by a rapid temperature rise.

What often occurs in these instances is that the roofing shingles which protect and waterproof the roof of a dwelling become frozen and lose their resiliency at sub-freezing temperatures. This lack of resiliency allows ice (which occupies a greater volume per unit mass than liquid water, and which has formed at the edge of the shingle) to "creep" underneath the stiffened shingle. This creep effect is exacerbated when the ambient temperature goes through a rapid thaw-freeze cycle because the ice originally trapped underneath a row of shingles does not completely thaw. When the temperature again falls below freezing, the ice trapped below the shingle is forced even further underneath the stiffened shingle by ice being newly formed at the exterior edge of the shingle.

Once the ice underneath the shingle is forced over the interior edge of the shingle, it comes in contact with the roof sheathing. Once in contact with the roof sheathing, heat from inside the dwelling is normally great enough to melt the ice, which then drips through the sheathing. The damage caused by such leakage can range from a minor nuisance to widespread destruction of the roof sheathing and interior plaster structures such as ceilings and walls.

Clearly, then, there is a need for an improved shingle which has a low-temperature stiffening point, and which remains flexible and pliant at sub-freezing temperatures. Such a shingle should also be of simple construction, and manufactured from readily available and inexpensive commodity materials.

Several different types and styles of shingles and other construction materials are described in the patent literature. Of particular note to the present disclosure is U.S. Pat. No. 3,830,687, issued Aug. 30, 1974, to Re et al. This reference describes a flame retardant roofing material designed to simulate wooden shake shingles. The roofing material includes a core of a gypsum material enclosed within a fiberglass shell containing fire-resistant materials such as asbestos. The core-shell construction of this simulated shake shingle is far more complex, and more costly to construct than the presently claimed shingle.

U.S. Pat. No. 4,047,962, issued Sep. 13, 1977, to Copeland, describes a moldable construction composition which can be wet mixed and utilized in pouring building walls, floors and the like. A preferred embodiment of the composition includes gypsum, vermiculite, portland cement, wood fibers, calcium chloride, sisal or polypropylene fiber, and water. The wet mixture is then allowed to cure to form a shrink-resistant construction material.

Another wet-mixed cement composition is described in U.S. Pat. No. 4,482,379, issued Nov. 13, 1984, to Dibrell. Dibrell describes a pumpable slurry containing a hydraulic cement, gypsum, calcium chloride, and a setting time retarding agent. The cement may also include an additive blend containing sodium metasilicate, lime, and hydroxyethyl cellulose. When cured, the composition displays good compressive strength at low temperatures.

U.S. Pat. No. 5,194,091, issued Mar. 16, 1993, to Laney, discloses a geopolymer-modified gypsum-based construction material. Here, a geopolymer adhesive is admixed with a conventional gypsum wallboard slurry. This produces an interpenetrating network which cures by the loss of process water. The resulting refractory solid is fire and water-resistant. The geopolymer adhesive component includes soluble and insoluble silicates, buffers, salts in aqueous suspension, and chemical setting agents.

U.S. Pat. No. 5,287,669, issued Feb. 22, 1994, to Hannah et al., describes a roofing shingle having very specific physical dimensions. Specifically, the shingle has an exposure height of 8 inches relative to an overall height of 18 inches. The shingles have 3 or 4 tabs, and a ratio of exposure height to tab width of either 0.667 or 0.889. These dimensions allow more shingles to be manufactured from a sheet of shingle material. Additionally, due to the ratio of the tabs, exposure height, and overall height of the shingle, a roof can be installed using fewer nails.

The remaining references cited on the form PTO-1449 submitted with the application are seen as being cumulative to the above-described references.

None of the above references, taken alone, or in any combination, is seen as describing the presently claimed shingle composition.

SUMMARY OF THE INVENTION

The present invention relates to a self-annealing asphalt roofing composition which remains flexible at temperatures below 32° F. The shingle composition comprises asphalt which has been admixed with one or more chloride salts. The mixture is then shaped into shingles of any desired shape, and employed in the same manner as conventional shingles.

The chloride salts which are preferably used in the present shingle composition are calcium chloride ($CaCl_2$), potassium chloride (KCl), magnesium chloride hexahydrate ($MgCl_2 \cdot 6H_2O$), and sodium chloride (NaCl). Of these chloride salts, potassium chloride is most preferred.

Shingles made according to the present invention have a low freezing point and remain flexible at temperatures as low as 8° F. This low temperature flexibility enables the shingles to resist ice and snow from creeping underneath the shingles when they are assembled as a roof covering. In addition, the colligative properties of the chloride salts inhibit the accumulation of snow and ice on the surface of the shingles by depressing the freezing point of the water which contacts the shingles. This is a very beneficial property in that it prevents large amounts of snow from accumulating on an angled rooftop, where the weight of the snow itself may cause an "avalanche" to fall onto people below.

In the view of the above discussion, it is a primary object of the present invention to provide a roofing shingle which remains flexible and pliant at temperatures below 32° F.

Another object of the present invention is to provide a roofing shingle which is simple in construction, and can be fabricated from readily available and inexpensive stock materials.

Still another object of the present invention is to provide a roofing shingle which resists the creep of ice and snow beneath the shingle.

These and other objects of the claimed invention will become clear upon a complete reading of the "Detailed Description," below.

DETAILED DESCRIPTION OF THE PREFERRED EMBODIMENT

The preferred embodiment of the present invention is a self-annealing shingle comprising from 18.4 to 31.0% by total weight granular potassium chloride, and the remainder to 100% asphalt granules. The ingredients are mixed together dry in a rotary mixer or other suitable mixing device and then pressed, either with or without heat, into sheets. Shingles are then cut, stamped, or formed from the sheets. The shingles may be affixed to a backing material such as tar paper, asphalt sheets, reinforced fiberglass matting, and the like. Reinforced fiberglass matting is preferred because it imparts added fire-resistance and weatherability to the finished shingle.

The shingles so formed can be used in any application where standard shingles are normally used. The shingles are long-lasting, water-repellent, heat-resistive, and remain flexible at sub-freezing temperatures.

Other equally acceptable embodiments of the present invention are disclosed by way of the following Examples. The Examples are for illustrative purposes only, and are not intended to limit the invention in any manner. Each of the compositions described in the Examples was formed into shingles using the above-described methodology. Each of the compositions described in the Examples below is formable into self-annealing shingles which remain flexible at sub-freezing temperatures, and inhibit the accumulation of snow and ice on the surface thereof.

EXAMPLE 1

0.071 ounces of granular calcium chloride ($CaCl_2$) was admixed 10 with 0.40 ounces of asphalt granules to yield a mixture containing approximately 15.0% by weight calcium chloride and 85.0% by weight asphalt. The mixture was then formed into standard roofing shingles and exposed to the elements.

Shingles constructed from this mixture remain flexible and pliant at a temperature of 8° F.

EXAMPLE 2

0.142 ounces of granular calcium chloride ($CaCl_2$) was admixed with 0.40 ounces of asphalt granules to yield a mixture containing approximately 26.2% by weight calcium chloride and 73.8% by weight asphalt. The mixture was then formed into standard roofing shingles and exposed to the elements.

Shingles constructed from this mixture remain flexible and pliant at a temperature of 8° F.

EXAMPLE 3

0.061 ounces of granular magnesium chloride hexahydrate ($MgCl_2$) was admixed with 0.40 ounces of asphalt granules to yield a mixture containing approximately 13.2% by weight magnesium chloride hexahydrate and 86.8% by weight asphalt. The mixture was then formed into standard roofing shingles and exposed to the elements.

Shingles constructed from this mixture remain flexible and pliant at a temperature of 8° F.

EXAMPLE 4

0.122 ounces of granular magnesium chloride hexahydrate ($MgCl_2$) was admixed with 0.40 ounces of asphalt granules to yield a mixture containing approximately 23.4% by weight magnesium chloride hexahydrate and 76.6% by weight asphalt. The mixture was then formed into standard roofing shingles and exposed to the elements.

Shingles constructed from this mixture remain flexible and pliant at a temperature of 8° F.

EXAMPLE 5

0.09 ounces of granular potassium chloride (KCl) was admixed with 0.40 ounces of asphalt granules to yield a mixture containing approximately 18.4% by weight potassium chloride and 81.6% by weight asphalt. The mixture was then formed into standard roofing shingles and exposed to the elements.

Shingles constructed from this mixture remain flexible and pliant at a temperature of 8° F.

EXAMPLE 6

0.180 ounces of granular potassium chloride (KCl) was admixed with 0.40 ounces of asphalt granules to yield a mixture containing approximately 31.0% by weight potassium chloride and 69.0% by weight asphalt. The mixture was then formed into standard roofing shingles and exposed to the elements.

Shingles constructed from this mixture remain flexible and pliant at a temperature of 8° F.

It is to be understood that the present invention is not limited to the embodiments described above, but includes any and all embodiments encompassed by the following claims.

I claim:

1. A roofing shingle comprised of asphalt sheet material having dispersed therein from 13 to 31% by weight of chloride salt selected from the group consisting of calcium chloride, magnesium chloride hexahydrate, potassium chloride, sodium chloride, and mixtures thereof.

2. The low freezing point roofing shingle according to claim 1, wherein said chloride salt is potassium chloride.

3. The low freezing point roofing shingle according to claim 2, wherein said potassium chloride is present in an amount of from 18.4% by weight to 31.0% by weight of the total weight of said shingle.

4. The low freezing point roofing shingle according to claim 1, wherein said chloride salt is magnesium chloride hexahydrate.

5. The low freezing point roofing shingle according to claim 4, wherein said magnesium chloride hexahydrate is present in an amount of from 13.2% by weight to 23.4% by weight of the total weight of said shingle.

6. The low freezing point roofing shingle according to claim 1, wherein said chloride salt is calcium chloride.

7. The low freezing point roofing shingle according to claim 6, wherein said calcium chloride is present in an amount of from 15.0% by weight to 26.2% by weight of the total weight of said shingle.

8. The roofing shingle according to claim 1, further comprising a backing material affixed to said sheet material.

9. The roofing shingle according to claim 8, wherein said backing material comprises reinforced fiberglass matting.

10. The roofing shingle according to claim 1 wherein said sheet material is fabricated from chloride salt granules mixed with asphalt granules.

\* \* \* \* \*